US012677853B2

(12) United States Patent
Ohira et al.

(10) Patent No.: US 12,677,853 B2
(45) Date of Patent: Jul. 14, 2026

(54) METHOD FOR MANUFACTURING PROCESSED MEAT FOOD, QUALITY MODIFIER FOR PROCESSED MEAT FOOD, AND PROCESSED MEAT FOOD

(71) Applicant: AJINOMOTO CO., INC., Tokyo (JP)

(72) Inventors: Takuya Ohira, Kawasaki (JP); Hiroyuki Nakagoshi, Kawasaki (JP); Fumiyuki Hirose, Kawasaki (JP); Hiroshi Takayanagi, Kawasaki (JP)

(73) Assignee: AJINOMOTO CO., INC., Tokyo (JP)

( * ) Notice: Subject to any disclaimer, the term of this patent is extended or adjusted under 35 U.S.C. 154(b) by 472 days.

(21) Appl. No.: 17/128,730

(22) Filed: Dec. 21, 2020

(65) Prior Publication Data

US 2021/0106031 A1      Apr. 15, 2021

Related U.S. Application Data

(63) Continuation of application No. PCT/JP2019/025236, filed on Jun. 25, 2019.

(30) Foreign Application Priority Data

Jun. 25, 2018     (JP) ................................. 2018-120014

(51) Int. Cl.
| | |
|---|---|
| A23L 13/40 | (2023.01) |
| A23L 13/50 | (2016.01) |
| A23L 13/60 | (2016.01) |
| A23L 29/00 | (2016.01) |

(52) U.S. Cl.
CPC .............. *A23L 13/48* (2016.08); *A23L 13/432* (2016.08); *A23L 13/55* (2016.08); *A23L 13/65* (2016.08); *A23L 29/015* (2016.08); *A23L 29/035* (2016.08); *A23L 29/06* (2016.08); *A23V 2002/00* (2013.01)

(58) Field of Classification Search
CPC .......... A23L 29/06; A23L 13/65; A23L 13/48; A23L 13/432; A23L 13/55; A23L 29/015
See application file for complete search history.

(56) References Cited

U.S. PATENT DOCUMENTS

| | | | |
|---|---|---|---|
| 4,917,904 A | 4/1990 | Wakameda et al. | |
| 6,383,533 B1 | 5/2002 | Soeda et al. | |
| 2010/0136167 A1 | 6/2010 | Yamada et al. | |

FOREIGN PATENT DOCUMENTS

| | | | | |
|---|---|---|---|---|
| CN | 102551110 A | 7/2012 | | |
| CN | 102150885 B | 3/2013 | | |
| CN | 105076917 A | 11/2015 | | |
| CN | 105077300 A | 11/2015 | | |
| CN | 106923207 A | 7/2017 | | |
| CN | 106923229 A | 7/2017 | | |
| CN | 107041515 A | 8/2017 | | |
| EP | 2 382 875 A1 | 11/2011 | | |
| EP | 2 636 318 A1 | 9/2013 | | |
| JP | 64-10949 A | 1/1989 | | |
| JP | 2000-60431 A | 2/2000 | | |
| JP | 2001-148 A | 1/2001 | | |
| JP | 2004089181 A | * 3/2004 | ............. | A23B 7/155 |
| JP | 2008-271793 A | 11/2008 | | |
| JP | 5056193 B2 | 10/2012 | | |
| JP | 5882792 82 | 3/2016 | | |
| JP | 2017-209052 A | 11/2017 | | |
| JP | 2018-102297 A | 7/2018 | | |
| WO | WO 2010/074338 A1 | 7/2010 | | |
| WO | WO 2012/060470 A1 | 5/2012 | | |
| WO | WO 2012/077817 A1 | 6/2012 | | |

OTHER PUBLICATIONS

JP 2004089181 A machine translation (Year: 2004).*
Extended European Search Report issued Feb. 21, 2022 in European Patent Application No. 19826391.5, 12 pages.
International Search Report issued Sep. 24, 2019 in PCT/JP2019/025236, 4 pages.
Office Action issued Oct. 17, 2023, in corresponding Japanese Patent Application No. 2020-527557 (with English Translation), 10 pages.
Office Action issued May 9, 2023, in corresponding Japanese Patent Application No. 2020-527557 (with English Translation), 8 pages.

* cited by examiner

*Primary Examiner* — Veri Stulii
(74) *Attorney, Agent, or Firm* — Oblon, McClelland, Maier & Neustadt, L.L.P.

(57) ABSTRACT

Adding (a) transglutaminase, and a gluconic acid salt or lipase to a processed meat food product, or (b) transglutaminase, a gluconic acid salt, and lipase to a processed meat food product with a sodium chloride content of 0.1 wt % to 1 wt % or a processed meat food product with a binding agent content of not more than 0.2 wt % affords a processed meat food product with a reduced sodium chloride content or a reduced binding agent content, with a good elastic texture.

8 Claims, 4 Drawing Sheets

METHOD FOR MANUFACTURING PROCESSED MEAT FOOD, QUALITY MODIFIER FOR PROCESSED MEAT FOOD, AND PROCESSED MEAT FOOD

CROSS REFERENCES TO RELATED APPLICATIONS

This application is a continuation of International Patent Application No. PCT/JP2019/025236, filed on Jun. 25, 2019, and claims priority to Japanese Patent Application No. 2018-120014, filed on Jun. 25, 2018, both of which are incorporated herein by reference in their entireties.

BACKGROUND OF THE INVENTION

Field of the Invention

The present invention relates to methods for producing a processed meat food product that is a processed meat food product with a reduced sodium chloride content or a reduced binding agent content, and a good elastic texture. The present invention also relates to processed meat food product modifiers capable of imparting elasticity to a processed meat food product with a reduced sodium chloride content or a reduced binding agent content. The present invention further relates to processed meat food products with a reduced sodium chloride content or a reduced binding agent content, and a good elastic texture.

Discussion of the Background

To improve the texture and quality of processed meat food products such as meat paste products (e.g., sausage, hamburg and the like), fish meat paste products (e.g., boiled fish paste, satsuma-age, fish ball and the like), and the like, use of enzyme preparations, preparations for processing meat, and the like have been proposed.

For example, a method of allowing transglutaminase to act on raw materials including fish meat and meat to improve water retentivity and texture (see JP-A-h01-010949, which is incorporated herein by reference in its entirety), a method of improving the quality of a processed meat food product while suppressing the quality deterioration due to the passage of time or freezing and thawing, by using α-glucosidase and transglutaminase (see JP-B-5056193, which is incorporated herein by reference in its entirety), a preparation for treating aquatic products or meat, containing a gluconic acid salt, calcium lactate and an alkali agent in a specific composition ratio (see JP-B-5882792, which is incorporated herein by reference in its entirety), a method for producing a processed meat food product with a preferable texture by emulsifying fat in a meat food material with protease and lipase (see JP-A-2008-271793, which is incorporated herein by reference in its entirety) and the like are disclosed.

On the other hand, with the background of recent health consciousness, the popularity of low-salt foods with reduced sodium chloride content is increasing, and the demand for processed meat food products with low salt is also increasing.

However, when the sodium chloride content is reduced, problems occur that the binding property of meat becomes low, a preferable elastic texture cannot be obtained easily, and transglutaminase which is used to improve the elasticity of processed meat food products shows lower function and cannot exhibit sufficient action and effect.

Therefore, a low-salt processed meat food product having a good elastic texture is desired.

Processed meat food products such as ham, sausage and the like contain phosphoric acid salts such as sodium pyrophosphate, sodium polyphosphate, sodium metaphosphate and the like as binding agents. Since phosphoric acid salts may inhibit calcium absorption in the body, the reduction of the use of such binding agents or no addition thereof is also desired.

SUMMARY OF THE INVENTION

Accordingly, it is one object of the present invention to provide novel processed meat food products with a reduced sodium chloride content, and a good elastic texture.

It is another object of the present invention to provide novel processed meat food products with a reduced binding agent content, or free of a binding agent, and having a good elastic texture.

These and other objects, which will become apparent during the following detailed description, have been achieved by the inventors' discovery that an elastic texture can be given to a processed meat food product with a reduced sodium chloride content by adding transglutaminase, and a gluconic acid salt or lipase, or transglutaminase, a gluconic acid salt, and lipase, during production of the processed meat food product.

In addition, they have found that an elastic texture can be given to a processed meat food product with a reduced binding agent content or free of a binding agent by adding transglutaminase, and a gluconic acid salt or lipase, or transglutaminase, a gluconic acid salt, and lipase, during production of the processed meat food product.

Furthermore, they have found that the texture of a processed meat food product with a reduced sodium chloride content is improved by adding transglutaminase, and one kind or two or more kinds selected from the group consisting of a gluconic acid salt and alkaline earth metal chloride, or by adding transglutaminase, lipase, and one kind or two or more kinds selected from the group consisting of a gluconic acid salt and alkaline earth metal chloride, during production of the processed meat food product.

That is, the present invention relates to the following.

(1) A method for producing a processed meat food product with a sodium chloride content of 0.1 wt % to 1 wt %, comprising adding transglutaminase, and a gluconic acid salt or lipase to a processed meat food product, or transglutaminase, a gluconic acid salt, and lipase to a processed meat food product.

(2) The production method of (1), wherein the gluconic acid salt is one kind or two or more kinds selected from the group consisting of sodium gluconate, potassium gluconate and calcium gluconate.

(3) The production method of (1) or (2), wherein the processed meat food product is a minced processed meat food product.

(4) A method for producing a processed meat food product with a binding agent content of not more than 0.2 wt %, comprising adding transglutaminase, and a gluconic acid salt or lipase to a processed meat food product, or transglutaminase, a gluconic acid salt, and lipase to a processed meat food product.

(5) The production method of (4), wherein the method produces a processed meat food product free of a binding agent.

(6) The production method of (4) or (5), wherein the gluconic acid salt is one kind or two or more kinds selected from the group consisting of sodium gluconate, potassium gluconate and calcium gluconate.

(7) The production method of any of (4) to (6), wherein the processed meat food product is a minced processed meat food product.

(8) A method for producing a processed meat food product with a sodium chloride content of 0.1 wt % to 1 wt %, comprising adding transglutaminase, and one kind or two or more kinds selected from the group consisting of a gluconic acid salt and alkaline earth metal chloride to a processed meat food product, or transglutaminase, lipase, and one kind or two or more kinds selected from the group consisting of a gluconic acid salt and alkaline earth metal chloride to a processed meat food product.

(9) The production method of (8), wherein the gluconic acid salt is one kind or two or more kinds selected from the group consisting of sodium gluconate, potassium gluconate and calcium gluconate.

(10) The production method of (8) or (9), wherein the alkaline earth metal chloride is calcium chloride.

(11) The production method of any of (8) to (10), wherein the processed meat food product is a minced processed meat food product or a processed food product of a chunk of meat.

(12) A modifier for a processed meat food product with a sodium chloride content of 0.1 wt % to 1 wt %, the modifier comprising transglutaminase, and a gluconic acid salt or lipase, or transglutaminase, a gluconic acid salt, and lipase.

(13) The modifier of (12), wherein the gluconic acid salt is one kind or two or more kinds selected from the group consisting of sodium gluconate, potassium gluconate and calcium gluconate.

(14) The modifier of (12) or (13), wherein the processed meat food product is a minced processed meat food product.

(15) A modifier for a processed meat food product with a binding agent content of not more than 0.2 wt %, the modifier comprising transglutaminase, and a gluconic acid salt or lipase, or transglutaminase, a gluconic acid salt, and lipase.

(16) The modifier of (15), wherein the modifier is for a processed meat food product free of a binding agent.

(17) The modifier of (15) or (16), wherein the gluconic acid salt is one kind or two or more kinds selected from the group consisting of sodium gluconate, potassium gluconate and calcium gluconate.

(18) The modifier of any of (15) to (17), wherein the processed meat food product is a minced processed meat food product.

(19) A modifier for a processed meat food product with a sodium chloride content of 0.1 wt % to 1 wt %, the modifier comprising transglutaminase, and one kind or two or more kinds selected from the group consisting of a gluconic acid salt and alkaline earth metal chloride, or transglutaminase, lipase, and one kind or two or more kinds selected from the group consisting of a gluconic acid salt and alkaline earth metal chloride.

(20) The modifier of (19), wherein the gluconic acid salt is one kind or two or more kinds selected from the group consisting of sodium gluconate, potassium gluconate and calcium gluconate.

(21) The modifier of (19) or (20), wherein the alkaline earth metal chloride is calcium chloride.

(22) The modifier of any of (19) to (21), wherein the processed meat food product is a minced processed meat food product or a processed food product of a chunk of meat.

(23) A processed meat food product with a sodium chloride content of 0.1 wt % to 1 wt %, comprising a meat treated with transglutaminase and lipase.

(24) A processed meat food product with a sodium chloride content of 0.1 wt % to 1 wt %, comprising a meat treated with transglutaminase or a meat treated with transglutaminase and lipase, and a gluconic acid salt.

(25) The food product of (24), wherein the gluconic acid salt is one kind or two or more kinds selected from the group consisting of sodium gluconate, potassium gluconate and calcium gluconate.

(26) The food product of any of (23) to (25), wherein the processed meat food product is a minced processed meat food product.

(27) A processed meat food product with a binding agent content of not more than 0.2 wt %, comprising a meat treated with transglutaminase and lipase.

(28) A processed meat food product with a binding agent content of not more than 0.2 wt %, comprising a meat treated with transglutaminase or a meat treated with transglutaminase and lipase, and a gluconic acid salt.

(29) The food product of (28), wherein the gluconic acid salt is one kind or two or more kinds selected from the group consisting of sodium gluconate, potassium gluconate and calcium gluconate.

(30) The food product of any of (27) to (29), wherein the food product is free of a binding agent.

(31) The food product of any of (27) to (30), wherein the food product is a minced processed meat food product.

(32) A processed meat food product with a sodium chloride content of 0.1 wt % to 1 wt %, comprising a meat treated with transglutaminase or a meat treated with transglutaminase and lipase, and one kind or two or more kinds selected from the group consisting of a gluconic acid salt and alkaline earth metal chloride.

(33) The food product of (32), wherein the gluconic acid salt is one kind or two or more kinds selected from the group consisting of sodium gluconate, potassium gluconate and calcium gluconate.

(34) The food product of (32) or (33), wherein the alkaline earth metal chloride is calcium chloride.

(35) The food product of any of (32) to (34), wherein the food product is a minced processed meat food product or a processed food product of a chunk of meat.

Advantageous Effects of Invention

According to the present invention, a production method of a processed meat food product with a reduced sodium chloride content but with a good elastic texture, a modifier for a processed meat food product which is capable of imparting a good elastic texture to a processed meat food product with a reduced sodium chloride content, and a processed meat food product with a reduced sodium chloride content but with a good elastic texture can be provided.

According to the present invention, moreover, a production method of a processed meat food product with a reduced binding agent content, or free of a binding agent but with a good elastic texture, a modifier for a processed meat food product which is capable of imparting a good elastic texture to a processed meat food product with a reduced binding agent content or free of a binding agent, and a processed meat food product with a reduced binding agent content or free of a binding agent, but with a good elastic texture can be provided.

The present invention can be particularly preferably applied to a minced processed meat food product markedly showing lower or insufficient meat binding property due to a reduced sodium chloride content, a reduced binding agent content and the like.

According to the present invention, moreover, a processed food product of a chunk of meat and the like with a reduced sodium chloride content but with an improved good texture such as fibrous feeling and the like can be provided.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
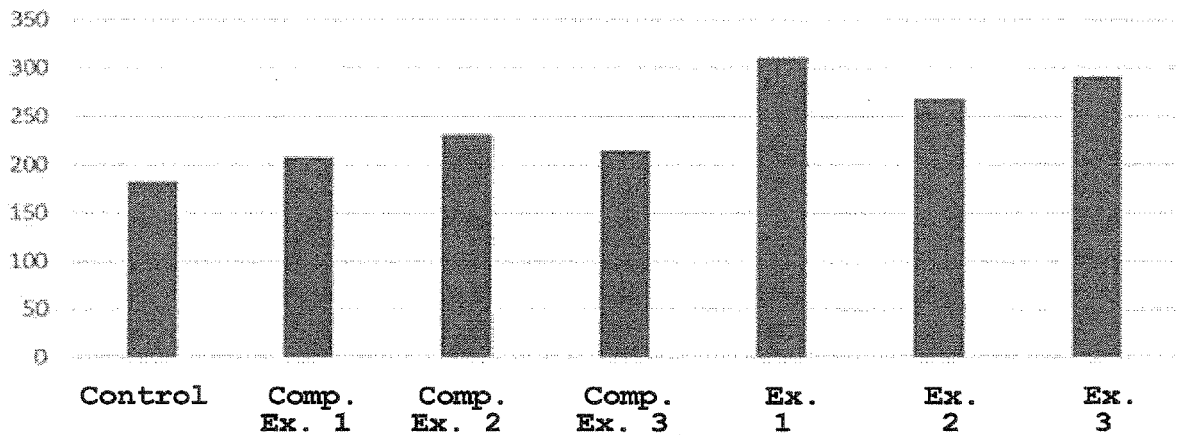
FIG. 1 shows the measurement results of the breaking strength of the sausages of the control, Examples 1 to 3, and Comparative Examples 1 to 3 in Experimental Example 1.

The present invention provides a production method of a processed meat food product with a reduced sodium chloride content or a reduced binding agent content or free of a binding agent, and a good elastic texture(hereinafter to be also referred to as "the production method of the present invention").

The production method of the present invention in a first embodiment is a production method of a processed meat food product with a sodium chloride content of 0.1 wt % to 1 wt %, including adding transglutaminase, and a gluconic acid salt or lipase to a processed meat food product, or adding transglutaminase, a gluconic acid salt, and lipase to a processed meat food product.

The production method of the present invention in a second embodiment is a production method of a processed meat food product with a binding agent content of not more than 0.2 wt %, including adding transglutaminase, and a gluconic acid salt or lipase to a processed meat food product, or adding transglutaminase, a gluconic acid salt, and lipase to a processed meat food product.

"Sodium chloride" is a seasoning added to impart a salty taste to a food product, and refers to one satisfying the standards for sodium chloride purity, auxiliary components, contents of mixed elements, and the like specified in the CODEX standard (International food product standard). In the present invention, those produced and sold as sodium chloride can be used.

In a first embodiment of the production method of the present invention, the content of sodium chloride is lower than the amount generally contained in a processed meat food product, and is 0.1 wt % to 1 wt %, preferably 0.5 wt % to 1 wt %, more preferably 0.8 wt % to 1 wt %, in a processed meat food product.

In a second embodiment of the production method of the present invention, the content of sodium chloride may be an amount generally contained in a processed meat food product, or may be lower than the amount generally contained. It is generally 0.1 wt % to 2.5 wt %, preferably 0.5 wt % to 2.5 wt %, more preferably 0.8 wt % to 2.5 wt %, in a processed meat food product.

In the present specification, the "processed meat food product" refers to a food product prepared by processing meat and the like.

The "meat" refers to an edible meat, and includes domestic animals such as cattle, swine, horse, sheep, goat, rabbit and the like, poultry such as chicken, crossbreed between the mallard and the domestic duck, duck, turkey, domestic duck, quail, guinea fowl, goose and the like, wild animals obtained by hunting such as wild boar, deer and the like, meat obtained from marine mammals such as whale, dolphin, sea lion and the like, and meat obtained from fish such as salmon, mackerel, horse mackerel, sardine, tuna, skipjack tuna, walleye pollack, sea bream, silver croaker, shark, Northern blenny, squid, shrimp and the like.

The processing means includes, but is not limited to, chopping, shredding, pulverizing, kneading, molding, drying, salting, pickling in miso, pickling in soy sauce, heating (boiling in water, steaming, baking, frying, smoking, etc.), fermenting and the like.

Specific examples of the processed meat food product include minced processed meat food products such as meat processed paste products obtained by shredding the meat of the above-mentioned domestic animals and poultry (meat of domesticated animals) to give minced meat, adding salt, spice and the like thereto, kneading the mixture, molding same, and subjecting same to the above-mentioned heat treatment (e.g., ham, bacon, sausage, hamburg, meat ball, shumai, gyoza, grilled chicken meat ball, fried cake of minced meat), fish meat processed paste products obtained by adding salt, seasoning and the like to minced meat of fish such as white-flesh fish, shark, squid, shrimp and the like, kneading the mixture, molding same, and subjecting same to a heat treatment (e.g. fish meat sausage, boiled fish paste, chikuwa, satsuma-age, hanpen, fish ball, shrimp ball), and the like, grilled meat, boiled meat, steamed meat, dried meat and the like.

Particularly, from the aspect that the effects of the present invention are obtained more preferably, the processed meat food product of the present invention is preferably provided as a minced processed meat food product, and is more preferably provided as the above-mentioned meat processed paste product.

In the production method of the present invention, transglutaminase to be added to processed meat food products is a transferase that catalyzes a reaction to form ammonia by condensing an amino group of glutamine on a protein with a primary amine and transferring a substituent on the amine to glutamine. Generally, the amino group of lysine on the protein is used as the primary amine, and it acts as a crosslinking enzyme.

Therefore, when transglutaminase is allowed to act on a food product material such as meat and the like, the protein contained in the food product material such as meat and the like is crosslinked.

As the transglutaminase, calcium independent transglutaminase obtained from a microorganism is preferably used.

Examples of the microorganism-derived calcium independent transglutaminase include transglutaminase produced by actinomycetes belonging to the genus streptomyces. It can be obtained according to the method described in JP-B-2572716, which is incorporated herein by reference in its entirety, and the like. Commercially available products such as "Activa TG-K", "Activa TG-S" and the like provided by Ajinomoto Co., Inc., and the like can also be used.

In the present invention, the amount of transglutaminase to be added is preferably not less than 0.0001 U (unit), more preferably not less than 0.01 U, per 1 g of the processed meat food product.

As regards the enzyme activity of transglutaminase, for example, benzyloxycarbonyl-L-glutaminyl glycine is reacted with hydroxylamine as a substrate to form an iron complex of the resulting hydroxamic acid in the presence of trichloroacetic acid, the absorbance at 525 nm is measured, and the amount of hydroxamic acid produced is determined from the calibration curve, whereby the enzyme activity can be calculated. In the present specification, the amount of enzyme that produces 1 μmol of hydroxamic acid in for 1 min at 37° C., pH=6.0 is defined as 1 U (see JP-A-64-27471, which is incorporated herein by reference in its entirety).

When excessive elasticity is imparted to a processed meat food product, the texture of the processed meat food product may be impaired. Thus, the amount of transglutaminase to be added in the present invention is preferably not more than 1 U, more preferably not more than 0.5 U, per 1 g of the food product.

In the production method of the present invention, the gluconic acid salt to be added together with transglutaminase is, for example, an edible salt of gluconic acid. Examples thereof include alkali metal salts such as lithium salt, sodium salt, potassium salt and the like; alkaline earth metal salts such as calcium salt, magnesium salt and the like; ammonium salt; transition metal salts such as zinc salt, iron salt, copper salt, manganese salt and the like; and solvates such as hydrates of these and the like, and the like. While such gluconic acid salts can be produced by a method known per se and used, products commercially available from various companies can also be used.

In the present invention, one kind of gluconic acid salt may be used alone, or two or more kinds thereof may be used in combination.

For the purpose of the present invention, sodium salt, potassium salt and calcium salt are preferably used, and potassium salt and calcium salt are more preferably used.

The amount of the gluconic acid salt to be added in the production method of the present invention is preferably 0.1 g to 5 g, more preferably 0.4 g to 2 g, further preferably 0.4 g to 1.3 g, in the amount converted to gluconic acid in a free form, per 100 g of the processed meat food product.

The amount of the gluconic acid salt to be added per transglutaminase activity 1 U (amount converted to gluconic acid in a free form (g)/transglutaminase activity (U)) is preferably 0.001 g/U to 500 g/U, more preferably 0.008 g/U to 1.3 g/U.

In the production method of the present invention, lipase can be added together with transglutaminase to the processed meat food product in place of the above-mentioned gluconic acid salt, or together with the above-mentioned gluconic acid salt.

Lipase is an enzyme that has the property of hydrolyzing the ester bonds that constitute lipids, and particularly refers to triacylglyceride lipase that decomposes triglyceride to release fatty acid.

For the purpose of the present invention, a lipase derived from a microorganism is preferably used. Examples include lipases derived from Genus Alcaligenes bacterium, Genus *Penicillium* fungi, Genus *Candida* fungi, Genus *Aspergillus* fungi and the like.

In the present invention, commercially available lipases provided by various companies such as lipase PL (derived from Genus *Alcaligenes* bacterium, Meito Sangyo Co., Ltd.), lipase QLM (derived from Genus *Alcaligenes* bacterium, Meito Sangyo Co., Ltd.), lipase R (derived from *Penicillium roqueforti,* Amano Enzyme Inc.), lipase A (derived from *Aspergillus niger,* Amano Enzyme Inc.) and the like can be used.

In the production method of the present invention, the amount of lipase to be added varies depending on the type of lipase and the like and is generally not less than 0.1 U, preferably not less than 1 U, per 1 g of the processed meat food product. It is generally not more than 10,000 U, preferably not more than 5,000 U, per 1 g of the processed meat food product.

The amount of lipase to be added per 1 U of transglutaminase activity is an amount that achieves the lipase activity of generally 0.1 U to 5,000,000 U, preferably 5 U to 400,000 U, more preferably 30 U to 30,000 U.

As for the enzyme activity of lipase, for example, the enzyme activity can be calculated by allowing lipase to act on an emulsion of olive oil to be a substrate for a certain period of time and quantifying the amount of released fatty acid with an alkali. In the present specification, the amount of enzyme that releases 1 μmol of fatty acid in 1 min at 37° C. is defined as 1 U.

In the production method of the present invention, transglutaminase, and a gluconic acid salt or lipase, or transglutaminase, a gluconic acid salt, and lipase are added to a processed meat food product to process the raw materials of the processed meat food product such as meat and other food product materials by bringing them in contact with the mixture.

The order of addition of transglutaminase, and a gluconic acid salt or lipase, or a gluconic acid salt and lipase may be any, and each may be simultaneously added to a processed meat food product, or any of them may be added first and the other(s) may be added later.

Transglutaminase, a gluconic acid salt and lipase may each be added in the form of powder or granules, or may be dissolved or suspended in water or the like and added in the form of liquid. As mentioned later, moreover, they may be added as a preparation in the form of liquid, semi-solid, solid or the like containing transglutaminase, and a gluconic acid salt or lipase, or containing transglutaminase, a gluconic acid salt, and lipase.

"Bringing into contact with raw materials of processed meat food product " means processing in which transglutaminase or the like in the above-mentioned form is attached to the raw materials of a processed meat food product, or a solution or suspension of transglutaminase or the like is applied to the raw materials of a processed meat food product, or the raw materials of a processed meat food product are immersed in a solution or suspension of transglutaminase or the like, or transglutaminase or the like each in the above-mentioned foriti is kneaded with the raw materials of a processed meat food product such as chopped, shredded or crushed meat and the like.

By bringing transglutaminase, and a gluconic acid salt or lipase, or transglutaminase, a gluconic acid salt, and lipase into contact with the raw materials of a processed meat food product, the function of transglutaminase can be sufficiently exerted even in a processed meat food product with a reduced sodium chloride content or a processed meat food product with a reduced binding agent content, and a crosslinking reaction of proteins in the raw materials of a processed meat food product can be carried out.

In the present invention, the crosslinking reaction of proteins in the raw materials of a processed meat food product by transglutaminase added to the processed meat food product is generally performed at 0° C. to 50° C., preferably 5° C. to 50° C., more preferably 30° C. to 50° C., generally for 1 min to 120 hr, preferably 1 min to 72 hr, more preferably 1 min to 24 hr, further preferably 1 min to 12 hr.

The hydrolysis of fats in the raw materials of a processed meat food product by lipase varies depending on the fat content of the raw materials of a processed meat food product, and the type of lipase to be used. It is performed at generally pH=3 to 11, preferably pH=4 to 9, generally 0° C. to 70° C., preferably 5° C. to 50° C., generally for 1 min to 120 hr, preferably 1 min to 72 hr, more preferably 1 min to 24 hr, further preferably 1 min to 12 hr, still more preferably 1 min to 6 hr.

Therefore, the step of adding transglutaminase, and a gluconic acid salt or lipase, or adding transglutaminase, a gluconic acid salt, and lipase to a processed meat food product to achieve a contact with the raw materials of the processed food product is preferably performed under conditions that satisfy the above-mentioned conditions.

In the present invention, a processed meat food product is produced by adding, where necessary, other food product materials and generally-used food additives to meat, mixing them, adding transglutaminase, and a gluconic acid salt or lipase, or adding transglutaminase, a gluconic acid salt, and lipase to allow contact with the aforementioned raw materials of the processed meat food product, molding or filling the mixture in a casing or the like, and processing same by general processing means such as pickling (salting, pickling in miso, pickling in soy sauce etc.), heating (drying, boiling in water, smoking, steaming etc.), fermenting and the like, followed by cooling as necessary.

Transglutaminase and the like may be contacted with the raw materials of a processed meat food product after various pickling processings. Molding, filling in a casing, etc. may be performed after pickling processing.

Meat is used as a chunk, or after chopping, shredding, pulverizing and the like, according to the form of the processed food product to be produced.

As the other food product materials, animal-derived fat such as beef tallow, lard and the like; starchy materials such as bread, wheat flour, rice, oatmeal, cornmeal, vermicelli and the like; plant-derived protein such as soybean protein and the like, and the like can be used.

The content of the meat in the processed meat food product is generally 30 wt % to 90 wt %, preferably 40 wt % to 80 wt %, more preferably 45 wt % to 70 wt %.

Examples of general food additive include excipients such as magnesium carbonate, saccharides (glucose, lactose, cornstarch, etc.), sugar alcohol (sorbitol, mannitol, etc.) and the like; binders such as gelatin, pregelatinized starch, partially pregelatinized starch, cellulose and a derivative thereof (crystalline cellulose, hydroxypropylcellulose etc.) and the like; disintegrants such as crospovidone, povidone, crystalline cellulose and the like; lubricants such as talc, magnesium stearate and the like; thickening stabilizers such as xanthan gum, carboxymethylcellulose sodium and the like; emulsifiers such as glycerol fatty acid ester, sucrose fatty acid ester, polyglycerol fatty acid ester, saponin, lecithin, casein sodium and the like; binding agents such as phosphoric acid salt (monosodium phosphate, dipotassium phosphate etc.), polyphosphoric acid salt (sodium polyphosphate, sodium metaphosphate etc.) and the like; preservatives such as sodium nitrite, sorbic acid and the like; antioxidants such as sodium L-ascorbate, catechin and the like; pH adjusters such as furnaric acid and the like; seasonings such as sodium chloride, soy sauce, umami seasoning (sodium L-glutamate, sodium inosinate etc.) and the like; colorants such as annatto dye, cochineal dye and the like; spice such as pepper, sage and the like; enrichments such as vitamins (L-ascorbic acid, ergocalciferol, β-carotene etc.), minerals (zinc salts, ferric chloride etc.), amino acids (sodium L-aspartate, DL-alanine, L-arginine, L-isoleucine etc.) and the like, and the like, and one kind or two or more kinds can be used.

In the second embodiment of the production method of the present invention, a processed meat food product with a reduced binding agent content, or free of a binding agent is produced.

As the binding agent, the above-mentioned phosphoric acid salt, polyphosphoric acid salt and the like can be mentioned.

In the second embodiment of the production method of the present invention, the content of a binding agent is preferably not more than 0.2 wt %, more preferably not more than 0.1 wt %, further preferably 0 wt % (that is, free of binding agent), of the total amount of the processed meat food product.

In the production method of the present invention, cooling after heating and processing may be performed by allowing to cool at room temperature or cooling with running water, or cooling to about 2° C. to 10° C. in a refrigerator.

According to the production method of the present invention, the crosslinking reaction of transglutaminase can be promoted in a processed meat food product that has a reduced sodium chloride content, and lower meat binding property, and cannot sufficiently exert the function of transglutaminase, or a processed meat food product that has a reduced binding agent content, or does not contain a binding agent, and shows insufficient meat binding property. Consequently, a good elastic texture can be obtained.

Therefore, the production method of the present invention can be preferably used for the production of a minced processed meat food product free from lower binding property due to a reduced sodium chloride content, and more remarkable insufficient binding property due to a reduced binding agent content, or no addition of a binding agent, such as sausage and the like.

As a preferred embodiment of the production method of the present invention, a production method of sausage is shown below.

Fat and the like are added as necessary to meat and a meat grinder (chopper) is use to make minced meat. Sodium chloride and, where necessary, food additives such as binder, preservative, antioxidant and the like are added. After kneading in a kneader and aging at low temperature (i.e., after salting treatment), seasonings are added and mixed, then transglutaminase and a gluconic acid salt or lipase, or transglutaminase, a gluconic acid salt, and lipase are added and they are mixed with a mixer, etc. The mixture is filled in a casing such as an animal intestine, a collagen casing, or the like, heat-treated by drying, smoking, steaming or the like, and then cooled.

Transglutaminase, a gluconic acid salt and lipase may also be added together with sodium chloride and food additives.

Furthermore, the production method of the present invention includes as a third embodiment a method for producing a processed meat food product with a sodium chloride content of 0.1 wt % to 1 wt %, including adding transglutaminase, and one kind or two or more kinds selected from the group consisting of a gluconic acid salt and alkaline earth metal chloride to a processed meat food product, or transglutaminase, lipase, and one kind or two or more kinds selected from the group consisting of a gluconic acid salt and alkaline earth metal chloride to a processed meat food product.

The processed meat food product, sodium chloride, transglutaminase and the amounts thereof to be added per 1 g of the processed meat food product, gluconic acid salt and lipase are as described above.

The amount of the gluconic acid salt to be added in the production method of this embodiment is preferably 0.01 g to 2.5 g, more preferably 0.1 g to 1 g, per 100 g of the processed meat food product.

As alkaline earth metal chloride in the production method of this embodiment, calcium chloride, magnesium chloride and the like can be mentioned, and calcium chloride is preferably used.

The amount of the alkaline earth metal chloride to be added is preferably 0.01 g to 2.5 g, more preferably 0.1 g to 1 g, per 100 g of the processed meat food product.

In the production method of this embodiment, one kind selected from the group consisting of a gluconic acid salt and alkaline earth metal chloride can be added alone, or two or more kinds can be selected and added in combination.

One kind or two or more kinds selected from the group consisting of a gluconic acid salt and alkaline earth metal chloride is/are added at generally 0.001 g to 0.5 g, preferably 0.05 g to 0.2 g, per 1 U of transglutaminase activity.

In the above, the amount of the gluconic acid salt to be added is an amount converted to gluconic acid in a free form.

From the aspect of the texture-improving effect on a processed meat food product, it is preferable to add transglutaminase, a gluconic acid salt and alkaline earth metal chloride, and a gluconic acid salt and alkaline earth metal chloride are preferably added at a ratio of the amounts of these to be added (amount of gluconic acid salt to be added as converted to the amount of gluconic acid in a free foim:amount of alkaline earth metal chloride to be added) (weight ratio) of 1:10 to 10:1, more preferably 1:6 to 5:1.

The addition of transglutaminase and the like, treatment of processed meat food product, specific production method of processed meat food product and the like in the production method of this embodiment are as described above with regard to the production methods of the first embodiment and the second embodiment of the present invention.

According to the production method of this embodiment, a processed meat food product with a reduced sodium chloride content and having a good elastic texture can be provided.

In addition, a preferable texture with the below-mentioned improved fibrous feeling and the like can be imparted to a. processed food product using a chunk of meat.

The present invention also provides a modifier for a processed meat food product with lower or insufficient meat binding property (hereinafter to be also referred to as "the modifier of the present invention").

The modifier of the present invention in a first embodiment is a modifier for a processed meat food product with a reduced sodium chloride content, and contains transglutaminase, and a gluconic acid salt or lipase, or transglutaminase, a gluconic acid salt, and lipase.

The modifier of the present invention in a second embodiment is a modifier for a processed meat food product with a reduced binding agent content, or free of a binding agent, and contains transglutaminase, and a gluconic acid salt or lipase, or transglutaminase, a gluconic acid salt, and lipase.

Furthermore, the modifier of the present invention in a third embodiment is a modifier for a processed meat food product with a reduced sodium chloride content, and contains transglutaminase, and one kind or two or more kinds selected from the group consisting of a gluconic acid salt and alkaline earth metal chloride, or transglutaminase, lipase, and one kind or two or more kinds selected from the group consisting of a gluconic acid salt and alkaline earth metal chloride.

Transglutaminase, a gluconic acid salt and lipase, and alkaline earth metal chloride contained in the modifier of the present invention are as described above with regard to the production method of the present invention.

In the present invention, transglutaminase, and a gluconic acid salt or lipase may be mixed, or transglutaminase, a gluconic acid salt, and lipase may be mixed and used as it is as the modifier of the present invention.

In addition, transglutaminase, and one kind or two or more kinds selected from the group consisting of a gluconic acid salt and alkaline earth metal chloride may be mixed, or transglutaminase, lipase, and one kind or two or more kinds selected from the group consisting of a gluconic acid salt and alkaline earth metal chloride may be mixed and used as it is as the modifier of the present invention.

The modifier of the present invention may further contain the above-mentioned general food additives.

The above-mentioned additives such as excipient, binder, disintegrant, lubricant, thickening stabilizer, emulsifier and the like, and a solvent such as water, ethanol and the like may be added as necessary to the modifier of the present invention and the mixture can have a form of a solid such as powder, granules, tablet and the like; semi-solid such as cream, paste, gel and the like; or a liquid such as solution, suspension, emulsified liquid and the like.

The content of transglutaminase in the modifiers of the first embodiment or the second embodiment of the present invention is an amount that achieves transglutaminase activity of generally 0.01 U to 1,000 U, preferably 0.1 U to 200 U, more preferably 1 U to 100 U, per 1 g of the modifier of the present invention.

The content of gluconic acid salt in the modifiers of the first embodiment or the second embodiment of the present invention as converted to the amount of gluconic acid in a free form is generally 1 wt % to 99 wt %, preferably 20 wt % to 99 wt %, based on the weight of the modifier.

The content of lipase in the modifiers of the first embodiment or the second embodiment of the present invention is an amount that achieves lipase activity of generally 100 U to 150,000 U, preferably 1,000 U to 120,000 U, more preferably 2,000 U to 100,000 U.

In the modifiers of the first embodiment and the second embodiment of the present invention, a gluconic acid salt is contained in an amount of generally 0.00001 g to 99 g, preferably 0.0005 g to 8 g, more preferably 0.001 g to 8 g, as converted to gluconic acid in a free form, per 1 U transglutaminase activity.

In the modifiers of the first embodiment and the second embodiment of the present invention, lipase is contained in an amount that achieves lipase activity of 0.1 U to 5,000,000 U, preferably 5 U to 400,000 U, more preferably 30 U to 30,000 U, per 1 U transglutaminase activity.

The modifier of the first embodiment of the present invention is useful as a modifier of a processed meat food product with a sodium chloride content of 0.1 wt % to 1 wt %, preferable for modifying a processed meat food product with a sodium chloride content of 0.5 wt % to 1 wt %, and more preferable for modifying a processed meat food product with a sodium chloride content of 0.8 wt % to 1 wt %.

The modifier of the second embodiment of the present invention is useful as a modifier of a processed meat food product with a binding agent content of not more than 0.2 wt %, preferable as a modifier of a processed meat food product with a binding agent content of not more than 0.1 wt %, and more preferable as a modifier of a processed meat food product free of a binding agent.

The processed meat food product for which the modifier of the second embodiment of the present invention is used may contain a general amount of sodium chloride and may have a reduced sodium chloride content. The content of sodium chloride in a processed meat food product for which the modifier of the second embodiment of the present invention is used is generally 0.1 wt % to 2.5 wt %, preferably 0.5 wt % to 2.5 wt %, more preferably 0.8 wt % to 2.5 wt %.

Sodium chloride and the binding agent are as described above with regard to the production method of the present invention.

The content of transglutaminase in the modifier of the third embodiment of the present invention and the like are as described above with regard to the modifier of the first embodiment.

In the modifier of the third embodiment of the present invention, the content of one kind or two or more kinds selected from the group consisting of a gluconic acid salt and alkaline earth metal chloride is generally 10 wt % to 99 wt %, preferably 20 wt % to 95 wt %, based on the weight of the modifier.

In the modifier of the third embodiment of the present invention, one kind or two or more kinds selected from the group consisting of a gluconic acid salt and alkaline earth metal chloride is/are contained at generally 0.001 g to 0.5 g, preferably 0.05 g to 0.2 g, per 1 U of transglutaminase activity.

In the above, the content of the gluconic acid salt is an amount converted to gluconic acid in a free form.

In the modifier of the third embodiment of the present invention, moreover, it is preferable to contain transglutaminase, a gluconic acid salt and alkaline earth metal chloride. In this case, a gluconic acid salt and alkaline earth metal chloride are preferably contained at a content ratio of these (content of gluconic acid salt converted to gluconic acid in a free foiiu:content of alkaline earth metal chloride) (weight ratio) of 1:10 to 10:1, more preferably 1:6 to 5:1.

The content of lipase and the like in the modifier of the third embodiment of the present invention are as described above with regard to the modifiers of the first embodiment or the second embodiment.

The modifier of the third embodiment of the present invention is useful as a modifier of a processed meat food product with a sodium chloride content of 0.1 wt % to 1 wt %, preferable for modifying a processed meat food product with a sodium chloride content of 0.5 wt % to 1 wt %.

Sodium chloride is as described above with regard to the production method of the present invention.

The modifier of the first embodiment or the second embodiment of the present invention containing transglutaminase, a gluconic acid salt or lipase, or transglutaminase, a gluconic acid salt and lipase, each in an amount that achieves the above-mentioned amount to be added relative to the processed meat food product, can be contacted with the raw materials of the processed meat food product. The "contact" with the raw materials of the processed meat food product is as described above.

In addition, the modifier of the third embodiment of the present invention containing transglutaminase, one kind or two or more kinds selected from the group consisting of a gluconic acid salt and alkaline earth metal chloride, or transglutaminase, one kind or two or more kinds selected from the group consisting of a gluconic acid salt and alkaline earth metal chloride, and lipase, each in an amount that achieves the above-mentioned amount to be added relative to the processed meat food product, can be contacted with the raw materials of the processed meat food product. The "contact" with the raw materials of a processed meat food product is as described above.

The modifier of the present invention can favorably improve the texture of a processed meat food product with a reduced sodium chloride content, or a processed meat food product with a reduced binding agent content or free of a binding agent, and can be particularly used for the improvement of the texture of a minced processed meat food product showing lower meat binding property due to a reduced sodium chloride content, or more remarkably showing insufficient meat binding property due to a reduced binding agent content.

In addition, the modifier of the present invention can improve the texture such as fibrous feeling and the like of a processed food product using a chunk of meat.

Furthermore, the present invention provides a processed meat food product with a reduced sodium chloride content, or a reduced binding agent content or free of a binding agent but having a good texture (hereinafter to be also referred to as "the processed meat food product of the present invention").

The processed meat food product of the present invention in the first embodiment has a reduced sodium chloride content of 0.1 wt % to 1 wt %, and contains a meat treated with transglutaminase and lipase, or a meat treated with transglutaminase or a meat treated with transglutaminase and lipase, and a gluconic acid salt.

The processed meat food product of the present invention in the second embodiment has a reduced binding agent content of not more than 0.2 wt %, and contains a meat treated with transglutaminase and lipase, or a meat treated with transglutaminase or a meat treated with transglutaminase and lipase, and a gluconic acid salt.

Furthermore, the processed meat food product of the present invention in the third embodiment has a reduced sodium chloride content of 0.1 wt % to 1 wt %, and contains a meat treated with transglutaminase, or a meat treated with transglutaminase and lipase, and one kind or two or more kinds selected from the group consisting of a gluconic acid salt and alkaline earth metal chloride.

Sodium chloride, binding agent, transglutaminase, gluconic acid salt and lipase, and alkaline earth metal chloride in the processed meat food product of the present invention are as described above with regard to the production method of the present invention.

In the processed meat food product of the present invention, the "meat treated with transglutaminase" or "meat treated with transglutaminase and lipase" refers to, as mentioned above with regard to the production method of the present invention, meat after adding transglutaminase to a processed meat food product, or adding transglutaminase and lipase to a processed meat food product and contacting the meat food product with transglutaminase and the like. The amounts of transglutaminase and lipase relative to the processed meat food product are as described above with regard to the production method of the present invention.

The content of the meat treated with transglutaminase, or meat treated with transglutaminase and lipase in the processed meat food product of the present invention is generally 30 wt % to 90 wt %, preferably 40 wt % to 80 wt %, more preferably 45 wt % to 70 wt %.

The content of the added gluconic acid salt in the processed meat food product of the first embodiment or the second embodiment of the present invention in an amount converted to gluconic acid in a free form is generally 0.1 wt % to 5 wt %, preferably 0.4 wt % to 2 wt %, further preferably 0.4 wt % to 1.3 wt % based on the weight of the process meat food product.

The content of added one kind or two or more kinds selected from the group consisting of a gluconic acid salt and alkaline earth metal chloride in the processed meat food product of the third embodiment of the present invention is generally 0.01 wt % to 3 wt %, preferably 0.4 wt % to 1.5 wt %, based on the weight of the processed meat food product. The content of the gluconic acid salt is shown in an amount converted to gluconic acid in a free form.

The processed meat food product in this embodiment preferably contains a gluconic acid salt and alkaline earth metal chloride, and the content ratio of these is as described above.

In the processed meat food products of the first embodiment and the second embodiment of the present invention, a gluconic acid salt may be simultaneously added together with transglutaminase or transglutaminase and lipase to a processed meat food product and contained therein.

In the processed meat food product of the third embodiment of the present invention, one kind or two or more kinds selected from the group consisting of a gluconic acid salt and alkaline earth metal chloride may be simultaneously added together with transglutaminase or transglutaminase and lipase to a processed meat food product and contained therein.

As long as the characteristics of the present invention are not impaired, the processed meat food product of the present invention can contain the above-mentioned other food product materials and food additives used generally. The contents of these are determined according to the kind and the like of the processed meat food product and the general contents thereof.

In the processed meat food product of the present invention, it is preferable to further mix by adding as necessary other food product materials and food additives to a meat treated with transglutaminase and lipase, or a meat treated with transglutaminase, or a meat treated with transglutaminase and lipase and added and mixed with a gluconic acid salt, or a meat treated with transglutaminase, or a meat treated with transglutaminase and lipase and added and mixed with one kind or two or more kinds selected from the group consisting of a gluconic acid salt and alkaline earth metal chloride, and freeze and preserve the mixture in a state of being filled in a casing or in a state of being cooled after the above-mentioned step of fermentation, heating and the like.

Frozen processed meat food products can be eaten by appropriately cooking by steaming, baking, frying, and the like in cooking equipment such as a steamer, oven, convection oven, steam convection oven, fryer and the like, or by cooking in a microwave oven.

The processed meat food product of the present invention has a reduced sodium chloride content, or a reduced binding agent content, and a good elastic texture.

Therefore, the processed meat food product of the present invention can be particularly preferably provided instead of a minced processed meat food product showing lower meat binding property due to a reduced sodium chloride content, or more remarkably showing insufficient meat binding property due to a reduced binding agent content. In the minced processed meat food product, lowering of the texture due to decreased or insufficient binding property of the minced meat can be favorably improved.

In addition, the processed meat food product of the third embodiment of the present invention is preferably provided as a processed meat food product using a chunk of meat, and the texture such as fibrous feeling and the like of the processed meat food product is improved.

Other features of the invention will become apparent in the course of the following descriptions of exemplary embodiments which are given for illustration of the invention and are not intended to be limiting thereof.

EXAMPLES

Examples 1 to 3, Comparative Examples 1 to 3

Production of Low-Salt Coarsely-Ground Sausage

A in Table 1 was minced into 5 mm square by a meat grinder (chopper), and B and D in Table 1 were added to the aforementioned minced meat and the mixture was mixed at 10° C. for 10 min by a kneader ("Tabletop Kneader PNV-5", IRIE SHOKAI CO., LTD.). Then, C in Table 1 was added, and the mixture was mixed by a kneader for 10 min. As shown in Table 2, transglutaminase, potassium gluconate and lipase were respectively added, and the mixture was mixed by a standard mixer ("KitchenAid KSM5WH", Whirlpool Corporation) at 2nd speed, 10° C. for 1 min, and then vacuum packaged.

It was filled in a collagen casing (DEVRO KK), dried at 60° C. for 30 min, smoked (60° C., for 10 min), steamed (75° C., for 30 min), and cooled overnight to produce low-salt coarsely-ground sausage.

As shown in Table 2, low-salt coarsely-ground sausage produced without adding any of transglutaminase, potassium gluconate and lipase was used as a control.

The raw materials used in the production of the low-salt coarsely-ground sausages of Examples and Comparative Examples are as follows.

(1) As sodium chloride, one for general food products was used. As polyphosphoric acid salt preparation, sodium nitrite preparation, sodium L-ascorbate, umami seasoning and white pepper, those commercially available as food additives were used.

(2) As transglutaminase, "Activa TG-S" (Ajinomoto Co., Inc.) (100 U/g) was used.

(3) As potassium gluconate, "Herushasu K" (FUSO CHEMICAL CO., LTD.) was used.

(4) As lipase, "lipase PL" (Meito Sangyo Co., Ltd.) (100,000 U/g) was used.

TABLE 1

|   | raw materials | content (wt %) |
|---|---|---|
| A | pork picnic | 65 |
|   | backfat of pork | 10 |
| B | sodium chloride | 0.92 |
|   | polyphosphoric acid salt preparation | 0.3 |
|   | sodium L-ascorbate | 0.08 |
|   | sodium nitrite preparation | 0.02 |
| C | umami seasoning | 0.2 |
|   | white pepper | 0.1 |
| D | cold water | amount that makes total amount 100 |

TABLE 2

| | content relative to total amount of processed meat food product | | | | | | |
|---|---|---|---|---|---|---|---|
| component | control | Comp. Ex. 1 | Comp. Ex. 2 | Comp. Ex. 3 | Ex. 1 | Ex. 2 | Ex. 3 |
| trans-glutaminase *1 | — | 0.05 | — | — | 0.05 | 0.05 | 0.05 |
| potassium gluconate *2 | — | — | 2 | — | 2 | — | 2 |
| lipase *3 | — | — | — | 3,000 | — | 3,000 | 3,000 |

*1 Activa TG-S (Ajinomoto Co., Inc.), the content in Table is in wt %.
*2 "Herushasu K" (FUSO CHEMICAL CO., LTD.), the content in Table is in wt %.
*3 "lipase PL" (Meito Sangyo Co., Ltd.), the content in Table is in ppm.

Experimental Example 1

Measurement of Breaking Strength of Low-Salt Coarsely-Ground Sausage

The breaking strength was measured for the low-salt coarsely-ground sausages produced in the above-mentioned Examples 1 to 3 and Comparative Examples 1 to 3 (hereinafter sometimes to be referred to like "sausage of Example 1"), together with the low-salt coarsely-ground sausage as the control.

The breaking strength of the low-salt coarsely-ground sausage was measured using a texture analyzer TA.XTplus (Stable Micro Systems) under the following measurement conditions (n=10). The measurement results are shown in FIG. 1.

<Measurement Conditions>

(i) plunger: spherical plunger with diameter =5 mm (ii) clearance: down 1 mm/sec, up 10 mm/sec (iii) measurement temperature: product temperature=room temperature As shown in FIG. 1, the breaking strength of the sausage of Comparative Example 1 in which transglutaminase alone contained in the processed meat food product was contacted with pork picnic and other raw materials was not much different from the control sausage, and it was suggested that the crosslinking action of transglutaminase does not function sufficiently in a processed meat food product with a reduced sodium chloride content (content in processed meat food product=0.92 wt %).

The breaking strength did not show a clear increase in the sausage of Comparative Example 2 in which potassium gluconate alone contained in the processed meat food product was contacted with the raw materials such as pork picnic and the like, and the sausage of Comparative Example 3 in which lipase alone therein was contacted.

In contrast, the sausage of Example 1 in which transglutaminase and potassium gluconate contained in the processed meat food product were contacted with the raw materials such as pork picnic and the like, the sausage of Example 2 in which transglutaminase and lipase contained in the processed meat food product were contacted with the raw materials, and the sausage of Example 3 in which transglutaminase, potassium gluconate and lipase contained in the processed meat food product were contacted with the raw materials showed a drastic increase in the breaking strength. Thus it was shown that the elasticity of the sausages was sufficiently improved.

Examples 4 to 8

Production of Low-Salt Coarsely-Ground Sausage

In the same manner as in the above-mentioned Example 1, low-salt coarsely-ground sausage was produced except that the amount of potassium gluconate was 1.0 wt % or 1.5 wt % relative to the processed meat food product (Examples 4 and 5).

In the same manner as in the above-mentioned Example 3, low-salt coarsely-ground sausage was produced except that the amount of potassium gluconate was 0.5 wt %, 1.0 wt % or 1.5 wt % relative to the processed meat food product (Examples 6 to 8).

Experimental Example 2

Measurement of Breaking Strength of Low-Salt Coarsely-Ground Sausage

The breaking strength of each of the low-salt coarsely-ground sausages produced in the above-mentioned Examples 4 to 8 was measured in the same manner as in the above-mentioned Experimental Example 1. The breaking strength was similarly measured for each of the sausages of control, Comparative Example 1 and Examples 1 and 3. The results are shown in FIGS. 2, 3.

Figure 2:
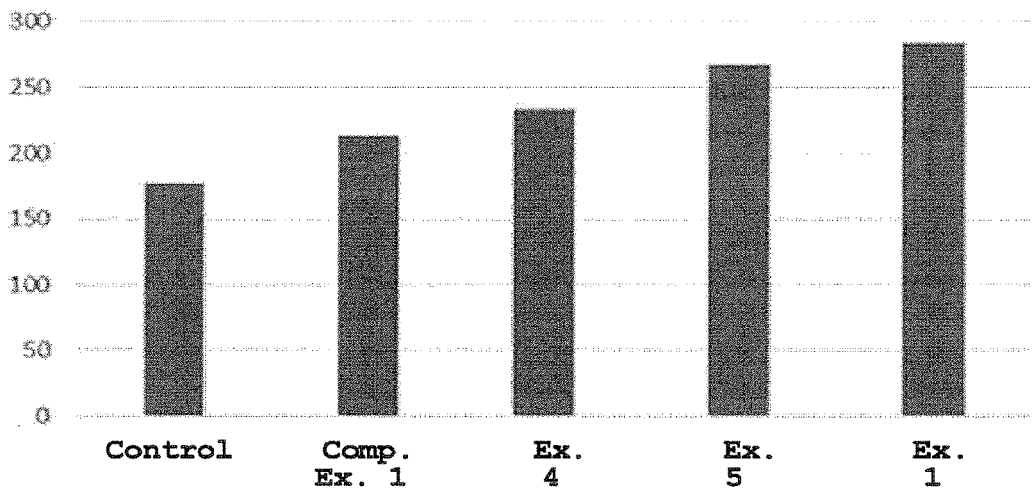
FIG. 2 shows the measurement results of the breaking strength of the sausages of the control, Examples 1, 4, 5, and Comparative Example 1 in Experimental Example 2.

As shown in FIG. 2, it was found that the breaking strength of a processed meat food product with a reduced sodium chloride content compared to the control sausage and the sausage of Comparative Example 1 is drastically improved by adding potassium gluconate (1.0 wt % to 2.0 wt %) together with transglutaminase (0.05 wt %) and contacting them with raw materials such as meat and the like.

However, a bitter taste was found in the sausage of Example 1 containing 2.0 wt % potassium gluconate relative to the processed meat food product.

Figure 3:
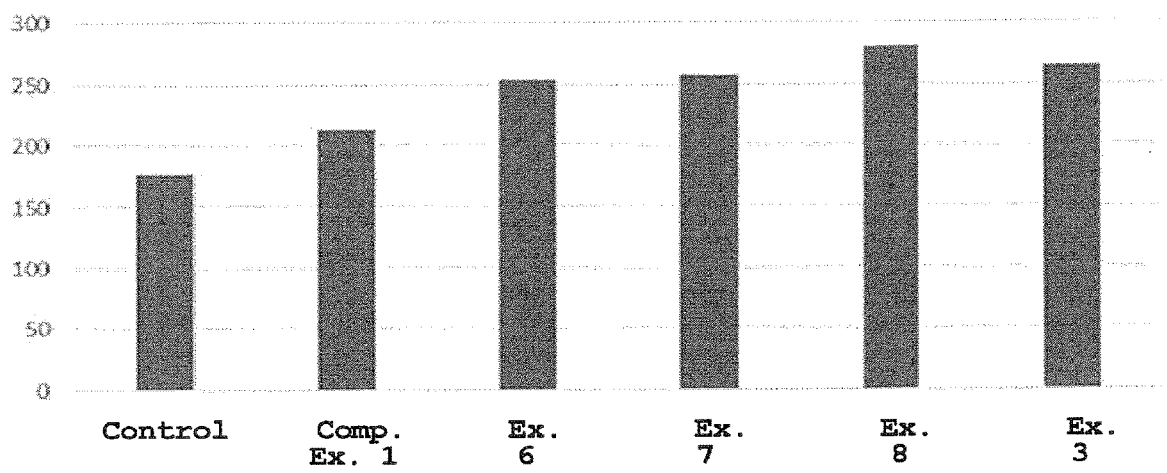
FIG. 3 shows the measurement results of the breaking strength of the sausages of the control, Examples 3, 6 to 8 and Comparative Example 1 in Experimental Example 2.

As shown in FIG. 3, when potassium gluconate was added to a processed meat food product together with transglutaminase (0.05 wt %) and lipase (3,000 ppm), the breaking strength was drastically improved by the addition of 0.5 wt % to 2.0 wt % thereof. When potassium gluconate was added at not less than 1.5 wt %, a bitter taste was found.

From the above-mentioned results of Experimental Example 2, it was suggested that, to obtain a processed meat food product with a good taste and good texture by adding transglutaminase and potassium gluconate to the processed TABLE 3-continued

|  | raw materials | content (wt %) |
|---|---|---|
| C | umami seasoning | 0.2 |
|  | white pepper | 0.1 |
| D | cold water | amount that makes total amount 100 |

TABLE 4

| | content relative to total amount of processed meat food product | | | | | | |
|---|---|---|---|---|---|---|---|
| component | control | Comp. Ex. 4 | Comp. Ex. 5 | Comp. Ex. 6 | Ex. 9 | Ex. 10 | Ex. 11 |
| trans-glutaminase *1 | — | 0.05 | — | — | 0.05 | 0.05 | 0.05 |
| potassium gluconate *2 | — | — | 1 | — | 1 | — | 1 |
| lipase *3 | — | — | — | 600 | — | 600 | 600 |

*1 Activa TG-S (Ajinomoto Co., Inc.), the content in Table is in wt %.
*2 "Herushasu K" (FUSO CHEMICAL CO., LTD.), the content in Table is in wt %.
*3 "lipase PL" (Meito Sangyo Co., Ltd.), the content in Table is in ppm.

meat food product, the amount of potassium gluconate is preferably 1.0 wt % to 1.5 wt % relative to the processed meat food product. When transglutaminase and lipase and potassium gluconate are added to the processed meat food product, the amount of potassium gluconate is preferably 0.5 wt % to 1.0 wt % relative to the processed meat food product.

Examples 9 to 11, Comparative Examples 4 to 6

Production of Low-Salt Coarsely-Ground Sausage

A in Table 3 was minced into 5 mm square by a meat grinder (chopper), and B and D in Table 3 were added to the aforementioned minced meat and the mixture was mixed at 10° C. for 10 min by a kneader ("Tabletop Kneader PNV-5", IRIE SHOKAI CO., LTD.). Then, C in Table 1 was added, and the mixture was mixed by a kneader for 10 min. As shown in Table 4, transglutaminase, potassium gluconate and lipase were respectively added, and the mixture was mixed by a standard mixer ("KitchenAid KSM5WH", Whirlpool Corporation) at 2nd speed, 10° C. for 1 min, and then vacuum packaged.

It was filled in a collagen casing (DEVRO KK), dried at 60° C. for 30 min, smoked (60° C., for 10 min), steamed (75° C., for 30 min), and cooled overnight to produce low-salt coarsely-ground sausage (fat content=20 wt %).

As shown in Table 4, low-salt coarsely-ground sausage produced without adding any of transglutaminase, potassium gluconate and lipase was used as a control.

The raw materials used in the production of the sausages of the above-mentioned Examples and Comparative Examples are the same as those used for the production of the sausages of Examples 1 to 3 and Comparative Examples 1 to 3.

TABLE 3

|  | raw materials | content (wt %) |
|---|---|---|
| A | pork picnic | 55 |
|  | backfat of pork | 20 |
| B | sodium chloride | 0.92 |
|  | polyphosphoric acid salt preparation | 0.3 |
|  | sodium L-ascorbate | 0.08 |
|  | sodium nitrite preparation | 0.02 |

Experimental Example 3

Measurement of Breaking Strength of Low-Salt Coarsely-Ground Sausage

The breaking strength was measured for each of the low-salt coarsely-ground sausages produced in the above-mentioned Examples 9 to 11 and Comparative Examples 4 to 6, and the low-salt coarsely-ground sausage of the control in the same manner as in the above-mentioned Experimental Example 1. The results are shown in FIG. 4.

Figure 4:
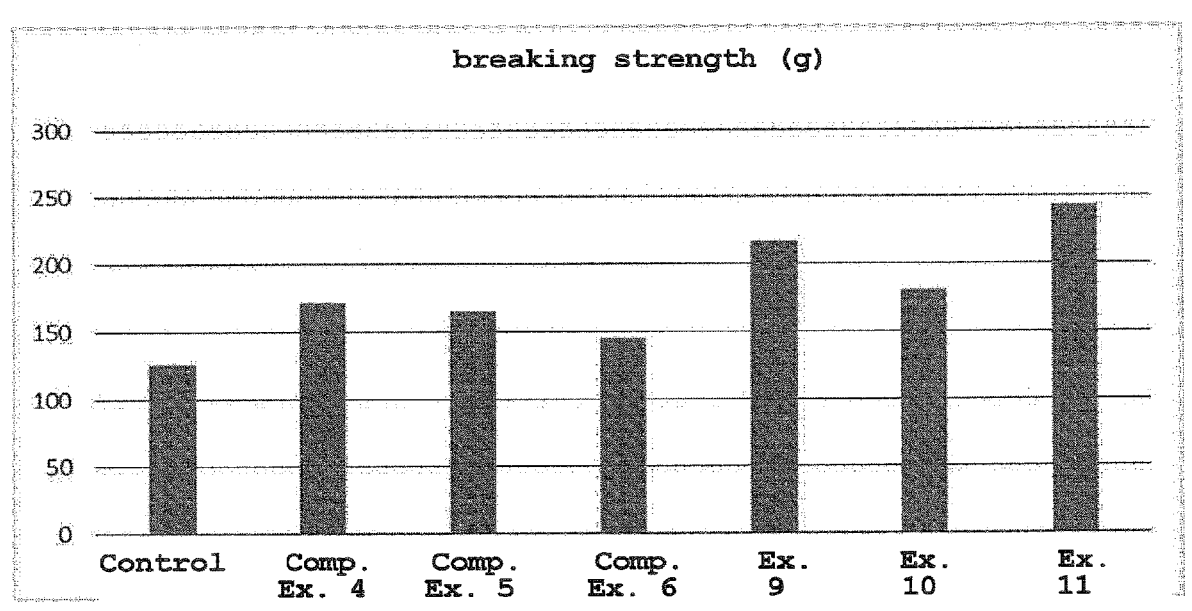
FIG. 4 shows the measurement results of the breaking strength of the sausages of the control, Examples 9 to 11 and Comparative Examples 4 to 6 in Experimental Example 3.

As shown in FIG. 4, in a low-salt coarsely-ground sausage with a fat content of 20 wt %, the sausage of Comparative Example 4 produced by adding transglutaminase alone to the raw materials did not show sufficient improvement of the breaking strength compared to the control sausage. It was suggested that transglutaminase does not function sufficiently when the sodium chloride content is reduced. The sausage of Comparative Example 5 produced by adding potassium gluconate alone and the sausage of Comparative Example 6 produced by adding lipase alone did not show improvement in the breaking strength.

In contrast, the sausages of Examples 9 to 11 of the present invention showed clear improvement of the breaking strength. Particularly, the sausage of Example 11 produced by adding transglutaminase, potassium gluconate and lipase showed remarkable improvement of the breaking strength.

From the above-mentioned results of Experimental Example 3, it was suggested that good elasticity is imparted even to a processed meat food product with a reduced sodium chloride content and a high fat content by adding and contacting transglutaminase, and a gluconic acid salt or lipase, or a gluconic acid salt and lipase to the raw materials.

Examples 12 to 17, Comparative Examples 7 to 12

Production of Phosphoric Acid Salt-Free Coarsely-Ground Susage

A in Table 5 was minced into 5 mm square by a meat grinder (chopper), and B and D in Table 5 were added to the aforementioned minced meat and the mixture was mixed at 10° C. for 10 min by a kneader ("Tabletop Kneader PNV-5", IRIE SHOKAI CO., LTD.). Then, C in Table 5 was added, and the mixture was mixed by a kneader for 10 min. As shown in Tables 6, 7, transglutaminase, a gluconic acid salt (potassium gluconate, calcium gluconate) and lipase were respectively added, and the mixture was mixed by a standard mixer ("KitchenAid KSM5WH", Whirlpool Corporation) at 2nd speed, 10° C. for 1 min, and then vacuum packaged.

It was filled in a collagen casing (DEVRO KK), dried at 60° C. for 30 min, smoked (60° C., for 10 min), steamed (75° C., for 30 min), and cooled overnight to produce phosphoric acid salt-free coarsely-ground sausage.

As shown in Tables 6, 7, coarsely-ground sausage produced without adding any of transglutaminase, a gluconic acid salt and lipase was used as a control.

The raw materials used in the production of the coarsely-ground sausages in the above-mentioned Examples and Comparative Examples are the same as those used for the production of the coarsely-ground sausages of Examples 1 to 3 and Comparative Examples 1 to 3. As calcium gluconate, "calcium gluconate" (FUSO CHEMICAL CO., LTD.) was used.

TABLE 5

| | raw material name | content (wt %) |
|---|---|---|
| A | pork picnic | 55 |
| | backfat of pork | 20 |
| B | sodium chloride | 1.22 |
| | polyphosphoric acid salt preparation | 0 |
| | sodium L-ascorbate | 0.08 |
| | sodium nitrite preparation | 0.02 |
| C | umami seasoning | 0.2 |
| | white pepper | 0.1 |
| | cold water | amount that makes total amount 100 |

TABLE 6

| | content relative to total amount of processed meat food product | | | | | | |
|---|---|---|---|---|---|---|---|
| component | control | Comp. Ex. 7 | Comp. Ex. 8 | Comp. Ex. 9 | Ex. 12 | Ex. 13 | Ex. 14 |
| trans-glutaminase [*1] | — | 0.05 | — | — | 0.05 | 0.05 | 0.05 |
| potassium gluconate [*2] | — | — | 2 | — | 2 | — | 2 |
| lipase [*3] | — | — | — | 3,000 | — | 3000 | 3,000 |

[*1] Activa TG-S (Ajinomoto Co., Inc.), the content in Table is in wt %.
[*2] "Herushasu K" (FUSO CHEMICAL CO., LTD.), the content in Table is in wt %.
[*3] "lipase PL" (Meito Sangyo Co., Ltd.), the content in Table is in ppm.

TABLE 7

| | content relative to total amount of processed meat food product | | | | | | |
|---|---|---|---|---|---|---|---|
| component | control | Comp. Ex. 10 | Comp. Ex. 11 | Comp. Ex. 12 | Ex. 15 | Ex. 16 | Ex. 17 |
| trans-glutaminase [*1] | — | 0.05 | — | — | 0.05 | 0.05 | 0.05 |
| calcium gluconate [*2] | — | — | 1.5 | — | 1.5 | — | 1.5 |
| lipase [*3] | — | — | — | 3,000 | — | 3,000 | 3,000 |

[*1] Activa TG-S (Ajinomoto Co., Inc.), the content in Table is in wt %.
[*2] "calcium gluconate" (FUSO CHEMICAL CO., LTD.), the content in Table is in wt %.
[*3] "lipase PL" (Meito Sangyo Co., Ltd.), the content in Table is in ppm.

Experimental Example 4

Measurement of Breaking Strength of Phosphoric Acid Salt-Free Coarsely-Ground Sausage The breaking strength of the sausages of the above-mentioned Examples 12-17 and Comparative Examples 7 to 12 was measured together with the control sausage in the same manner as in the above-mentioned Experimental Example 1 and using a texture analyzer TA.XTplus (Stable Micro Systems). The measurement results are shown in FIGS. 5 and 6.

Figure 5:
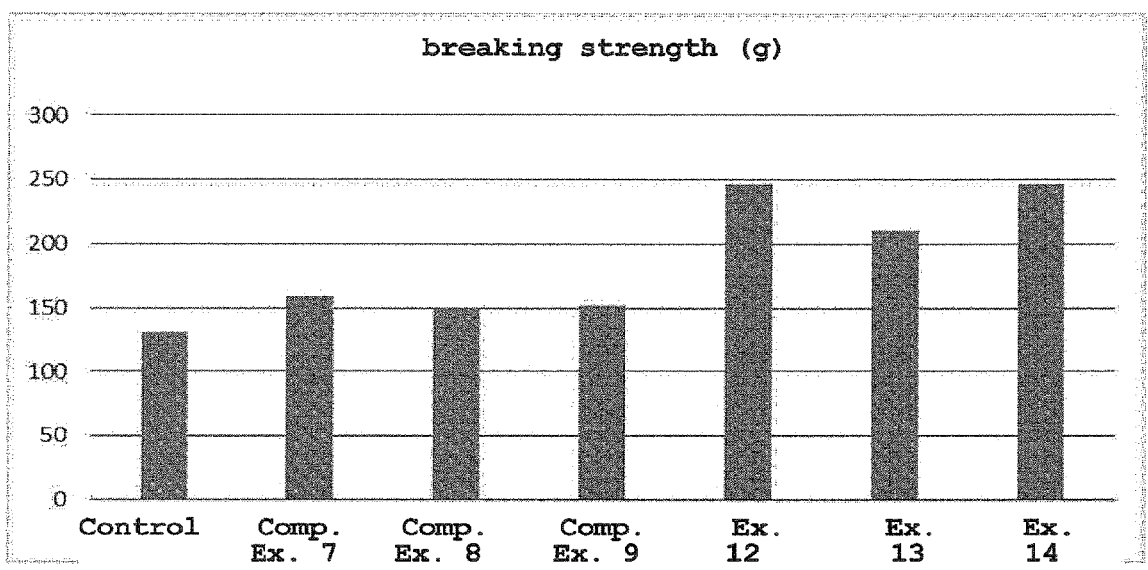
FIG. 5 shows the measurement results of the breaking strength of the sausages of the control, Examples 12 to 14 and Comparative Examples 7 to 9 in Experimental Example 4.
Figure 6:
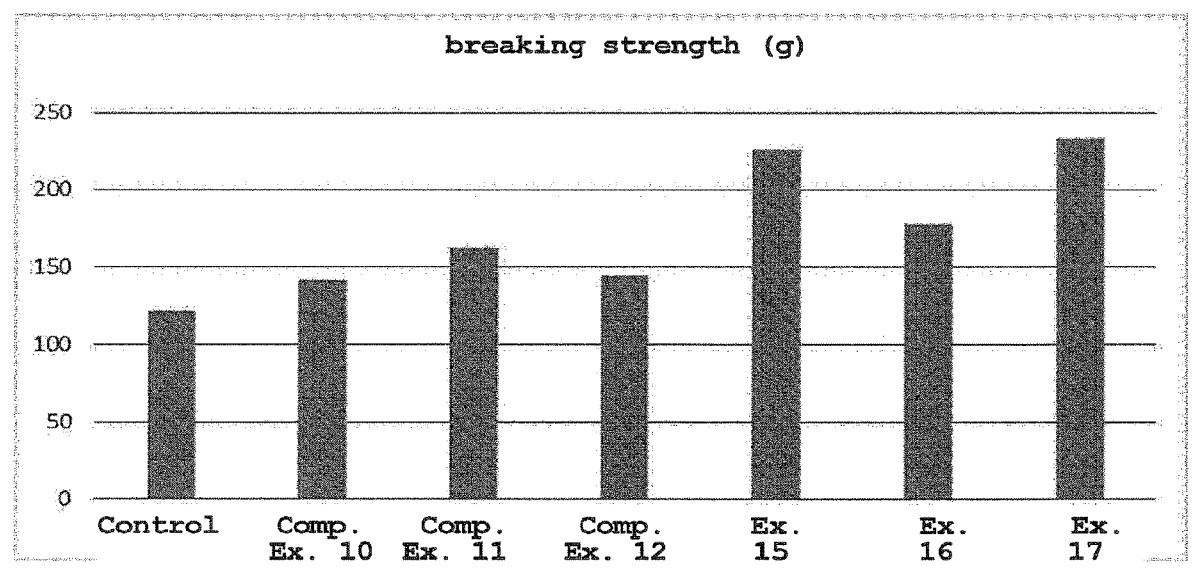
FIG. 6 shows the measurement results of the breaking strength of the sausages of the control, Examples 15 to 17 and Comparative Examples 10 to 12 in Experimental Example 4.

As shown in FIGS. 5 and 6, when coarsely-ground sausages free of a binding agent, polyphosphoric acid salt preparation, were produced by adding transglutaminase alone (Comparative Examples 7, 10), the breaking strength of the produced sausages was not much different from the breaking strength of the control sausage. It was suggested that the addition of only transglutaminase cannot sufficiently compensate for the insufficient binding property due to the non-addition of the binding agent. The breaking strength was not improved in the sausages produced by adding calcium gluconate alone (Comparative Examples 8, 11), or the sausages produced by adding lipase alone (Comparative Examples 9, 12).

In contrast, the sausages produced by adding transglutaminase, and potassium gluconate or calcium gluconate (Examples 12, 15), the sausages produced by adding transglutaminase and lipase (Examples 13, 16), and the sausages produced by adding transglutaminase, potassium gluconate or calcium gluconate, and lipase (Examples 14, 17) showed clear improvement in the breaking strength as compared to the control sausage.

Particularly, the sausages produced by adding transglutaminase, and potassium gluconate or calcium gluconate (Examples 12, 15), and the sausages produced by adding transglutaminase, potassium gluconate or calcium gluconate, and lipase (Examples 14, 17) showed remarkable improvement in the breaking strength.

Examples 18 to 20, Comparative Examples 13 to 15

Production of Phosphoric Acid Salt-Free Coarsely-Ground Sausage

Using the raw materials with the composition shown in Table 8, phosphoric acid salt-free coarsely-ground sausages (fat content =10 wt %) of Examples 18 to 20 and Comparative Examples 13 to 15 were produced in the same manner as in the above-mentioned Examples 12 to 17 and Comparative Examples 7 to 12 except that transglutaminase, sodium gluconate and lipase were each added as shown in Table 9.

As shown in Table 9, coarsely-ground sausage produced without adding any of transglutaminase, a gluconic acid salt and lipase was used as a control.

The raw materials used in the production of the coarsely-ground sausages in the above-mentioned Examples and Comparative Examples are the same as those used for the production of the coarsely-ground sausages of Examples 1 to 3 and Comparative Examples 1 to 3. As sodium gluconate, "herushasu A" (FUSO CHEMICAL CO., LTD.) was used.

TABLE 8

| | raw material name | content (wt %) |
|---|---|---|
| A | pork picnic | 65 |
| | backfat of pork | 10 |
| B | sodium chloride | 1.22 |
| | polyphosphoric acid salt preparation | 0 |
| | sodium L-ascorbate | 0.08 |
| | sodium nitrite preparation | 0.02 |
| C | umami seasoning | 0.2 |
| | white pepper | 0.1 |
| | cold water | amount that makes total amount 100 |

TABLE 9

| | | content relative to total amount of processed meat food product | | | | | |
|---|---|---|---|---|---|---|---|
| component | control | Comp. Ex. 13 | Comp. Ex. 14 | Comp. Ex. 15 | Ex. 18 | Ex. 19 | Ex. 20 |
| trans-glutaminase [*1] | — | 0.05 | — | — | 0.05 | 0.05 | 0.05 |
| sodium gluconate [*2] | — | — | 1.5 | — | 1.5 | — | 1.5 |
| lipase [*3] | — | — | — | 1,800 | — | 1,800 | 1,800 |

[*1] Activa TG-S (Ajinomoto Co., Inc.), the content in Table is in wt %.
[*2] "herushasu A" (FUSO CHEMICAL CO., LTD.), the content in Table is in wt %.
[*3] "lipase PL" (Meito Sangyo Co., Ltd.), the content in Table is in ppm.

Experimental Example 5

Measurement of Breaking Strength of Phosphoric Acid Salt-Free Coarsely-Ground Sausage The breaking strength of each of the sausages of the above-mentioned Examples 18 to 20 and Comparative Examples 13 to 15 was measured together with the control sausage in the same manner as in the above-mentioned Experimental Example 1 by using a texture analyzer TA.XTplus (Stable Micro Systems). The measurement results are shown in FIG. 7.

Figure 7:
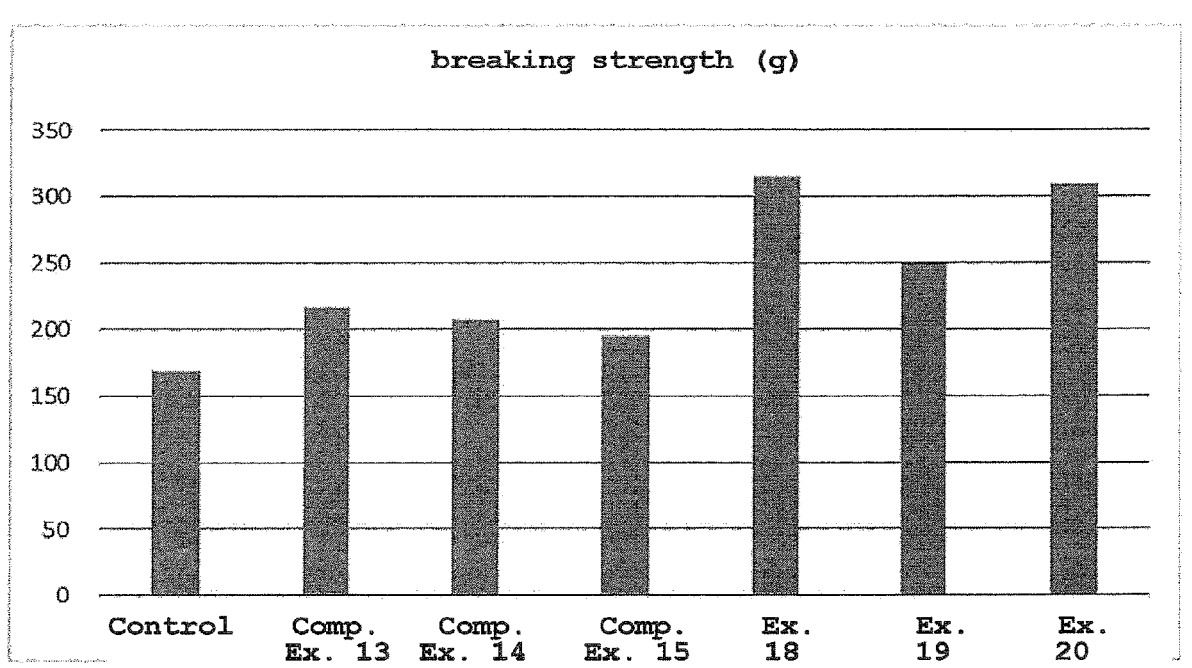
FIG. 7 shows the measurement results of the breaking strength of the sausages of the control, Examples 18 to 20 and Comparative Examples 13 to 15 in Experimental Example 5.

As shown in FIG. 7, when coarsely-ground sausage (fat content =10 wt %) free of a binding agent, polyphosphoric acid salt preparation, was produced by adding transglutaminase alone (Comparative Example 13), the breaking strength of the produced sausage was not much different from that of the control sausage. It was suggested that the addition of only transglutaminase cannot sufficiently compensate for the insufficient binding property due to the non-addition of the binding agent. The breaking strength was not improved in the sausage produced by adding sodium gluconate alone (Comparative Example 14), or the sausage produced by adding lipase alone (Comparative Example 15).

In contrast, in the sausage produced by adding transglutaminase and sodium gluconate (Example 18), the sausage produced by adding transglutaminase and lipase (Example 19), the sausage produced by adding transglutaminase, sodium gluconate and lipase (Example 20) showed clear improvement in the breaking strength as compared to the control sausage.

Particularly, the sausage produced by adding transglutaminase and sodium gluconate (Example 18), and the sausage produced by adding transglutaminase, sodium gluconate and lipase (Example 20) showed remarkable improvement in the breaking strength.

From the above-mentioned results of Experimental Examples 4 and 5, a minced processed meat food product free of a polyphosphoric acid salt preparation serving as a binding agent and having insufficient binding property also showed a drastic increase in the breaking strength, and it was suggested that the elasticity of the sausage is sufficiently improved by the present invention.

Examples 21 to 27, Comparative Examples 16 to 20

Modifier for Highly Hydrated Chicken for Yakitori

The raw materials shown in Table 10 were sequentially added to water and mixed to prepare a pickling liquid. Then, The raw materials shown in Table 11 were respectively added to prepare modifiers for highly hydrated chicken for yakitori of Examples 21 to 27, and Comparative Examples 16 to 20. A pickling liquid free of the raw materials shown in Table 11 was used as a control.

The raw materials shown in Tables 10, 11 are as follows.

(1) As sodium L-glutamate, "Ajinomoto" (Ajinomoto Co., Inc.) was used.

(2) As transglutaminase, "KS-CT" (Ajinomoto Co., Inc.) (transglutaminase activity =100 U/g) was used.

(3) As calcium chloride, "calcium chloride H" (Tomita Pharmaceutical Co., Ltd.) was used.

(4) As sodium gluconate, "herushasu A" (FUSO CHEMICAL CO., LTD.) was used.

(5) As other raw materials, general raw materials commercially available for food products were used.

TABLE 10

| raw material name | content (wt %) |
|---|---|
| processed starch | 6.5 |
| egg protein | 4.3 |
| sodium chloride | 2.16 |
| polyphosphoric acid salt preparation | 0.87 |
| granulated sugar | 0.87 |
| xylose | 0.65 |
| sodium L-glutamate | 0.43 |
| water | 84.22 |
| total | 100 |

TABLE 11

| | addition amount (parts by weight) *1 | | | | | | | | | | | |
|---|---|---|---|---|---|---|---|---|---|---|---|---|
| raw materials | Comp. Ex. 16 | Comp. Ex. 17 | Ex. 21 | Ex. 22 | Comp. Ex. 18 | Comp. Ex. 19 | Comp. Ex. 20 | Ex. 23 | Ex. 24 | Ex. 25 | Ex. 26 | Ex. 27 |
| transglutaminase *2 | 0.5 | 0.32 | 0.44 | 0.44 | 0.38 | 0.39 | 0.28 | 0.28 | 0.28 | 0.28 | 0.28 | 0.28 |
| L-arginine | — | 0.16 | — | — | — | — | — | — | — | — | — | — |
| calcium chloride *3 | — | — | 0.22 | — | — | — | — | 2.83 | 2.83 | 1.68 | 0.55 | — |
| sodium gluconate *4 | — | — | — | 0.22 | — | — | — | — | 0.57 | 1.68 | 2.77 | 2.77 |
| tartaric acid | — | — | — | — | 0.19 | — | — | — | — | — | — | — |
| sodium L-ascorbate | — | — | — | — | — | 0.195 | — | — | — | — | — | — |

*1 Amount added per 100 parts by weight of pickling liquid.
*2 "KS-CT" (Ajinomoto Co., Inc.) (transglutaminase activity = 100 U/g)
*3 "calcium chloride H" (Tomita Pharmaceutical Co., Ltd.)
*4 "herushasu A" (FUSO CHEMICAL CO., LTD.)

Experimental Example 6

Evaluation of Modification Effect of Modifier for Highly Hydrated Chicken for Yakitori (1) Preparation of Highly Hydrated Chicken for Yakitori Frozen Brazilian chicken legs were thawed, the skin, excess fat, cartilage and gristle were removed, and the thigh portion was molded into 20 g(±2 g)/piece. The obtained molded meat (about 1 kg) was immersed in each of the modifiers (about 300 g) of Examples 21 to 27 and Comparative Examples 16 to 20, vacuum-packed, and subjected to a tumbling treatment using a tumbler (Tonichi KK) at 5° C., 15 rpm for 1 hr.

After draining, the treated chicken was heated (95° C., 10 min) using a steamer (Yanagiya Machinery Co., Ltd.) to prepare highly hydrated yakitori. The prepared highly hydrated yakitori was allowed to cool, stood in an open state in a freezer (−20° C.) for 1 hr to 2 hr, and frozen.

The frozen highly hydrated yakitori was heated in a microwave oven (Panasonic Corporation) (1800 W, 1 min), and then evaluated for the following by seven specialized panelists.

(2) Evaluation of Heating Yield and Fibrous Feeling (i) Heating Yield

The "heating yield" means the weight of a food product after water has flown out from the inside of the food product by a heat treatment.

For the heating yield, the panelists observed changes in the appearance of and the degree of syneresis from the yakitori due to the heat treatment, compared them with those of the highly hydrated yakitori prepared using the pickling liquid of the control (hereinafter to be referred to as "control product") and evaluated according to the following evaluation criteria. The evaluation results were determined by the consultation by seven panelists.

Evaluation Criteria x: Clearly lowered yield compared to control product

Δ: Same level of heating yield as control product

◯: Improved heating yield compared to control product

⊙: Clearly improved heating yield compared to control product (ii) Fibrous Feeling The "fibrous feeling" means a feeling that the fibers of the meat are loosened one by one upon chewing the processed meat food product.

The fibrous feeling was evaluated according to the following evaluation criteria by panelists who ate highly hydrated yakitori. The evaluation results were determined by the consultation by seven panelists.

<Evaluation Criteria>

+: equivalent to control product

++: somewhat improved compared to control product

+++: improved compared to control product

++++: moderately improved compared to control product

+++++: drastically improved from control product (iii) Total Evaluation

The evaluation results of the above-mentioned heating yield and the fibrous feeling were combined, and the desirability as a processed meat food product was evaluated according to the following evaluation criteria. The evaluation results were determined by the consultation by seven panelists.

<Evaluation Criteria>

+: highly unpreferable as processed meat food product

++: not preferable as processed meat food product

+++: slightly preferable as processed meat food product

++++: preferable as processed meat food product

+++++: highly preferable as processed meat food product

The above-mentioned evaluation results are shown in Table 12.

TABLE 12

| | evaluation item | | |
|---|---|---|---|
| sample | heating yield | fibrous feeling | total evaluation |
| Comp. Ex. 16 | Δ | + | + |
| Comp. Ex. 17 | ◯ | + | ++ |
| Ex. 21 | Δ | ++ | +++ |
| Ex. 22 | Δ | ++ | +++ |
| Comp. Ex. 18 | x | +++ | + |
| Comp. Ex. 19 | Δ | + | ++ |
| Comp. Ex. 20 | Δ | + | + |
| Ex. 23 | Δ | ++ | +++ |
| Ex. 24 | Δ | +++ | +++ |
| Ex. 25 | Δ | +++ | +++ |

TABLE 12-continued

| | evaluation item | | |
|---|---|---|---|
| sample | heating yield | fibrous feeling | total evaluation |
| Ex. 26 | Δ | ++++ | ++++ |
| Ex. 27 | Δ | ++ | +++ |

As shown in Table 12, when immersed in each of the modifiers of Examples 21 to 27, the heating yield was evaluated to be equivalent to that when immersed in the control pickling liquid. However, improvement was observed in the fibrous feeling of the yakitori, and the total evaluation was slightly preferable or preferable.

In particular, when immersed in the modifiers of Examples 24 to 26 containing transglutaminase and calcium chloride and sodium gluconate, the effect of improving fibrous feeling was high. Among them, when immersed in the modifier of Example 26, a considerable fibrous feeling improving effect was observed. The modifier of Example 26 contained calcium chloride and sodium gluconate, which were contained together with transglutaminase, at a gluconic acid salt content converted to gluconic acid in a free form: alkaline earth metal chloride content (weight ratio)=4.5:1.

On the other hand, when immersed in each modifier of Comparative Examples 16, 19 and 20 and subjected to the pickling treatment, the heating yield was evaluated to be equivalent to that when immersed in the control pickling liquid. However, improvement in the fibrous feeling was not observed, and the total evaluation was unpreferable or highly unpreferable.

When immersed in the modifier of Comparative Example 17, the heating yield was improved than when immersed in the control pickling liquid. However, improvement in the fibrous feeling was not observed, and the total evaluation was unpreferable as a processed meat food product.

When immersed in the modifier of Comparative Example 18, a fibrous feeling improving effect was observed, but the heating yield was lower than when immersed in the control pickling liquid, and the total evaluation was highly unpreferable as a processed meat food product.

From the above-mentioned results of Experimental Example 6, it was suggested that the modifier of the present invention can improve the fibrous feeling of meat without affecting the heating yield in the processed meat food products using a chunk of meat such as yakitori.

INDUSTRIAL APPLICABILITY

As described in detail above, according to the present invention, a production method of a processed meat food product with a reduced sodium chloride content but with a good elastic texture, a modifier for a processed meat food product which is capable of imparting a good elastic texture to a processed meat food product with a reduced sodium chloride content, and a processed meat food product with a reduced sodium chloride content but with a good elastic texture can be provided.

According to the present invention, moreover, a production method of a processed meat food product with a reduced binding agent content, or free of a binding agent but with a good elastic texture, a modifier for a processed meat food product which is capable of imparting a good elastic texture to a processed meat food product with a reduced binding agent content or free of a binding agent, and a processed meat food product with a reduced binding agent content or free of a binding agent, but with a good elastic texture can be provided.

The present invention can be particularly preferably applied to a minced processed meat food product markedly showing lower or insufficient meat binding property due to a reduced sodium chloride content, a reduced binding agent content and the like.

According to the present invention, moreover, a processed food product of a chunk of meat and the like with a reduced sodium chloride content but with an improved good texture such as fibrous feeling and the like can be provided.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A method for producing a processed meat food product, comprising adding:

transglutaminase, a gluconic acid salt, and lipase to a processed meat food product, wherein the processed meat food product is a meat processed paste product or a fish meat processed paste product, a content of sodium chloride of the processed meat food product is 0.1 wt % to 1 wt %, an amount of transglutaminase to be added is 0.01 U to 0.5 U per 1 g of the processed meat food product, an amount of the gluconic acid salt to be added is 0.4 g to 1.3 g in an amount converted to gluconic acid in a free form, per 100 g of the processed meat food product, and an amount of lipase to be added per 1 U of transglutaminase activity is an amount that achieves a lipase activity of 30 U to 30,000 U.

2. The production method according to claim 1, wherein said gluconic acid salt is at least one selected from the group consisting of sodium gluconate, potassium gluconate, and calcium gluconate.

3. A method for producing a processed meat food product, comprising adding:

transglutaminase, a gluconic acid salt, and lipase to a processed meat food product, wherein the processed meat food product is a meat processed paste product or a fish meat processed paste product, a content of a binding agent of the processed meat food product is not more than 0.2 wt %, the binding agent is at least one selected from the group consisting of phosphoric acid salt and polyphosphoric acid salt, an amount of transglutaminase to be added is 0.01 U to 0.5 U per 1 g of the processed meat food product, an amount of the gluconic acid salt to be added is 0.4 g to 1.3 g in an amount converted to gluconic acid in a free form, per 100 g of the processed meat food product, and an amount of lipase to be added per 1 U of transglutaminase activity is an amount that achieves a lipase activity of 30 U to 30,000 U.

4. The production method according to claim 3, wherein said method produces a processed meat food product free of a binding agent.

5. The production method according to claim 3, wherein said gluconic acid salt is at least one selected from the group consisting of sodium gluconate, potassium gluconate, and calcium gluconate.

6. A method for producing a processed meat food product, comprising adding:

transglutaminase, lipase, and at least one selected from the group consisting of a gluconic acid salt and alkaline earth metal chloride to a processed meat food product, wherein the processed meat food product is a meat processed paste product or a fish meat processed paste product, a content of sodium chloride of the processed meat food product is 0.1 wt % to 1 wt %, an amount of transglutaminase to be added is 0.01 U to 0.5 U per 1 g of the processed meat food product, an amount of the at least one selected from the group consisting of gluconic acid salt and alkaline earth metal chloride to be added is 0.05 g to 0.2 g per 1 U of transglutaminase activity (the amount of gluconic acid salt to be added is an amount converted to gluconic acid in a free form), and an amount of lipase to be added per 1 U of transglutaminase activity is an amount that achieves a lipase activity of 30 U to 30,000 U.

7. The production method according to claim 6, wherein said gluconic acid salt is at least one selected from the group consisting of sodium gluconate, potassium gluconate, and calcium gluconate.

8. The production method according to claim 6, wherein the alkaline earth metal chloride is calcium chloride.

\* \* \* \* \*